Figure 1:
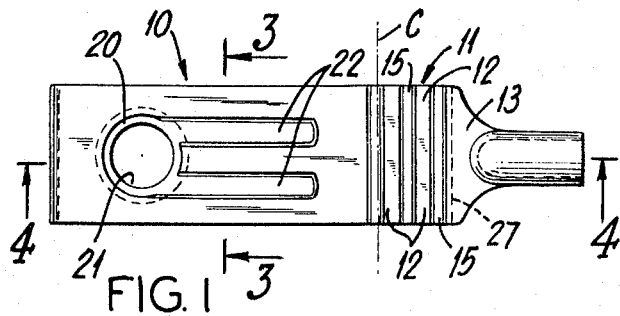

Nov. 8, 1966  F. KLUMPP, JR  3,284,758

FOLD-OVER BLADES

Filed May 19, 1964

INVENTOR.
FERDINAND KLUMPP, JR.

BY

ATTORNEYS.

United States Patent Office 3,284,758
Patented Nov. 8, 1966

3,284,758
FOLD-OVER BLADES
Ferdinand Klumpp, Jr., Union, N.J., assignor to Heyman Manufacturing Company, Kenilworth, N.J., a corporation of New Jersey
Filed May 19, 1964, Ser. No. 368,461
7 Claims. (Cl. 339—195)

The present invention relates to a cap-line construction for a fold-over electric contact blade and a thin stock fold-over blade.

In the production of electric contact blades, it has been found advantageous to mold caps around blades which have connected wires. The molding is usually done by injection. A cap can easily be molded around cord sets of blades in a mold. The blades may be manually positioned in the mold or may be fixed by being held in position with a load bar.

The cavities used for molding are oftentimes of standard size with a bowed area somewhere beyond the cap-line to accommodate various shapes of blades such as the folded-over blade which may be bowed in its midsection.

Most blades are of standard thickness at the cap-line, determined by safety specifications usually between .055–.065 thick and so the usual die cavity may be adapted to receive many different types of blades, such as solid stock, or various types of folded-over blades, as long as the cap-line opening is approximately .060 inch.

For proper molding, it is essential that the blade being molded into a new cap, fits snugly in the mold at the cap line. Without the snug fit, the plastic of the cap may run beyond the cap line and foul the blade or provide edges which must be trimmed in another operation or not pass safety inspection. The plastic may even render the blade incapable of being insertable into an electric outlet.

The safety standard of .055–.065 of blade thickness has generally resulted in the widespread use of die cavities having standard apertures for blades of about .060 inch thick which satisfactorily accept standard blades and prevent escape of plastic from the mold cavity.

In certain instances safety standards permit the use of very thin stock (less than .030) in the making of fold-over blades for particular uses. While the folded stock may be thin, the blade using thin stock must meet certain standards under compression about equal to the .060 standard. Bowing the blade shank of thin stock blades has met this standard in the past, but has usually resulted in a narrow shank at the cap line of a mold, thus requiring a new mold for thin stock folded blades.

The use of thin stock folded blades has worked a great economy of cost but in the past some of this economy has been lost because expensive new cavities had to be made to accommodate the blade in order to avoid plastic flow from the mold beyond the cap line, or idle machine time alone has proven an expense changing over to new die cavities.

While standards have allowed the use of thin stock, most thin stock blades of the past have not been satisfactory since they have been weak, especially along the cap line and easily broken off or bent. Blades of the past have also found it difficult to meet normal compression test thickness which is still substantially the thickness of standard blades.

According to the present invention, a cap-line construction for fold-over electric contact blades is provided which may fit the standard mold cavity and which prevents the outflow of plastic from a mold. A sturdy fold-over blade is further provided adapted to be made of thin stock and also meet normal compression standards.

Although such novel feature or features believed to be characteristic of the invention are pointed out in the claims, the invention and the manner in which it may be carried out, may be further understood by reference to the description following and the accompanying drawings.

Figure 3:
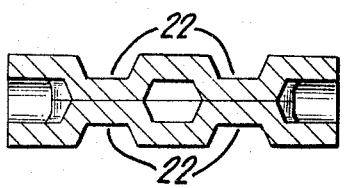
Figure 2:
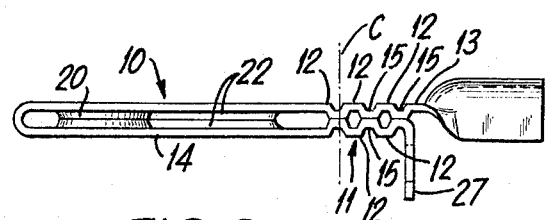
Figure 4A:
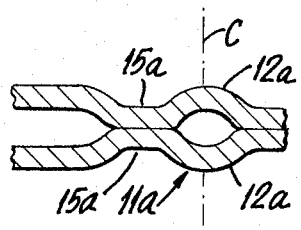
Figure 4:
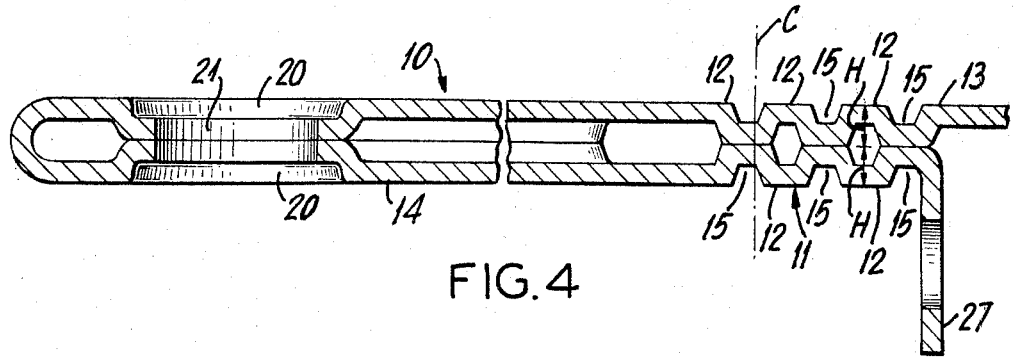
Figure 5:
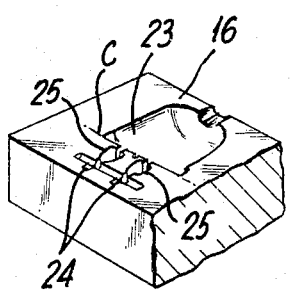
Figure 6:
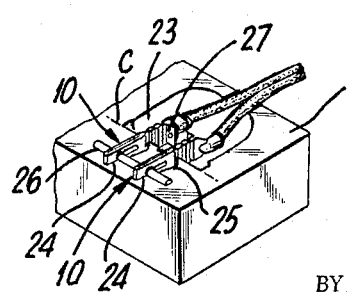

FIG. 1 is a plan view of an embodiment of the present invention.
FIG. 2 is a side elevation of the blade of FIG. 1.
FIG. 3 is a section taken at lines 3—3 of FIG. 1.
FIG. 4 is a section taken at lines 4—4 of FIG. 1.
FIG. 4a is a modified detail of FIG. 1.
FIG. 5 is an empty cap die cavity.
FIG. 6 is a cap die cavity with a cord set and blades of the present invention ready to be molded into a cap.

Referring now to the figures in greater detail, where like reference numbers denote like parts in the various figures.

A blade 10 is provided with a cap-line construction 11 comprising at least one ridge 12 in each fold section 13, 14 of a fold-over blade 10 and at least one valley 15. FIGS. 1, 2 and 4 illustrate the fold-over blade 10 with a plurality of ridges 12 and valleys 15 in each fold section 13, 14 of a blade 10.

The ridges 12 and valleys 15 extend across the width of the fold-over blade 10 and are constructed so that opposite valleys 15 tend to meet under compression. Where the cap-line construction 11 is intended as a dam against molding plastic in the molding of standard electric caps with blades, the height H as shown in FIG. 4 from the base line of the valleys 15 to the top of the ridge is approximately .030 of an inch. Thus, the compressed blade has a thickness of .060 from the outer extremities of opposing ridges 12. The dimension of .060 is the desired dimension for present electrical safety standards.

In principal, the dimension is not as significant as the relation between the ridge-to-ridge dimension as related to the mold used in conjunction with the fold-over blade 10.

While a bowed blade is not shown illustrated in the figures, the effect of the cap-line construction 11 of the present invention would be similar were the fold sections 13, 14 to bow away from the outermost ridges 12.

The cap-line construction as shown in FIGS. 1, 2 and 4 having a plurality of ridges 12 and valleys 15 provides the fold-over blade 10 with extra strength against bending. Under bending tension the plurality of opposing valleys 15 meet and oppose each other. A single ridge 12 and valley 15 might serve as a fulcrum for bending the fold-over blade 10 out of shape under tension, though a single cap-line construction 11 could still serve its function as a plastic dam in a mold.

FIG. 4a shows a cap-line construction 11a with a ridge 12a and valleys 15a. The ridges 12a have rounded tops as distinguished from the more flattened tops shown in the other figures. Care must be taken when only a single ridge and valley cap-line construction 11 is used to accurately place the cap-line construction 11a at the cap-line c in the mold so the single pair of ridges 12 will act as an effective dam.

Where the preferred embodiment of FIGS. 1, 2 and 4 is used any one of the ridge 12 pairs in the cap-line construction 11 may serve as an effective plastic dam, thus not placing criticality upon the placement of the blade 10 in the die 16.

Safety standards require a minimum thickness under compression of a fold-over blade 10, especially when made of thin stock. Present safety specifications permit stock under some circumstances to be as thin as .015 if normal compression will bring the blade within the .055–.065 range of thickness.

Heretofore in the use of thin stock in the making of fold-over blade 10, the proper normal compression dimension has been maintained by providing the blade 10 with an indentation such as a dimple (not shown) or by forming an indentation 20 at the point of the load bar hole 21, the meeting of these indentations forming a compression limit within acceptable ranges. In the past thin stock blades have relied upon a bowing, giving a spring-like effect to maintain rigidity and to hold a blade in an outlet but blades of such construction have usually been flimsy when made of the thinnest stock presently within the standard .015 inch.

The fold-over blade 10 is provided with spines 22 shown in FIGS. 1, 2, 3 and 4 which in effect are like the valleys in the cap-line construction 11. Under compression the fold-over blade 10 cannot be compressed beneath the tolerance limits of normal compression.

The spines 22 provide a rigidity permitting the use of thin stock not heretofore effective for sturdy fold-over blades.

The indentation 20 and cap-line construction 11 also combine to provide a further bracing of the blade.

In use, the fold-over blades 10 may be machine crimped to conductor wires and then placed in a mold cavity 23 of a die 16 for the molding of a cap.

FIGS. 5 and 6 show standard mold cavities. The blade portions 24 have hollows 25 which are adapted to accommodate the bowed blades of the past or the standard thickness blades such as shown in FIG. 6 where blades 10 of the present invention are set in the cavity.

Accurate placement of the fold-over blades 10 can be effected by use of a load bar 26 as shown in FIG. 6. The load bar makes certain that the anchor 27, which is just a projecting lip, is molded within the cap without exposure through any part of the cap to firmly anchor the blades 10 in the cap after they have been molded into the plastic cap.

The portion from the cap line c to the hollow area 25 is of the standard thickness as maintained by the ridges 12 and valleys 15, the spines 22 which are similar to the valleys 15 and the indentations 20. The fold-over blades 10 cap-line construction effectively forms a dam in the closed cavity 23 preventing the outflow of plastic beyond the cap line c as indicated in FIG. 6.

The terms and expressions which are employed are used as terms of description, it is recognized, though, that various modifications are possible within the scope of the invention claimed.

Having thus described certain forms of the invention in some detail, what is claimed is:

1. A fold-over electric contact blade comprising a first blade section; including a shank; and one end adapted to be attached to an electric wire, a second blade section; including a shank, each said shank each having at least one transverse ridge portion, said ridge portion being across the width of said shank at the cap line of said blade, and said first and second blade sections adapted to be folded with said ridge portions juxtaposed to limit the thinness of the finished blade.

2. A fold-over electric contact blade comprising a first blade section; including a shank; and one end adapted to be attached to an electric wire, a second blade section; including a shank; and a lip, each said shank each having at least one transverse ridge portion, said ridge portion being across the width of said shank at the cap line of said blade, and said first and second blade sections adapted to be folded with said ridge portions juxtaposed to limit the thinness of the finished blade.

3. A fold-over electric contact blade comprising a first blade section; including a shank; and one end adapted to be attached to an electric wire, a second blade section; including a shank, each said shank each having at least one transverse ridge portion, said ridge portion being across the width of said shank at the cap line of said blade, said first and second blade sections adapted to be folded with said ridge portions juxtaposed to limit the thinness of the finished blade, and said juxtaposed ridge portions having a thickness approximately equal to a standard electric contact blade.

4. A fold-over electric contact blade adapted to be made from thin stock comprising a first blade section; including a shank; and one end adapted to be attached to an electric wire, a second blade section; including a shank, each said shank each having at least one transverse ridge portion, said ridge portion being across the width of said shank at the cap line of said blade, and said first and second blade sections adapted to be folded with said ridge portions juxtaposed to limit the thinness of the finished blade.

5. A fold-over electric contact blade adapted to be made from thin stock comprising a first blade section; including a shank; and one end adapted to be attached to an electric wire, a second blade section; including a shank; each said shank having a plurality of transverse ridges across the width of said shank substantially at the cap line of said blade, said first and second blade sections adapted to be folded with said ridges juxtaposed to limit the thinness of the finished blade, and said juxtaposed ridges and shank portions having the thickness of a standard blade under normal compression.

6. A fold-over electric contact blade adapted to be made from thin stock comprising a first blade section; including a shank; and one end adapted to be attached to an electric wire, a second blade section; including a shank, each said shank having a plurality of transverse ridges across the width of said shank substantially at the cap line of said blade, at least one longitudinal valley for at least part of its length, a load bar hole, said load bar hole being indented, said first and second blade sections adapted to be folded with said ridges, valley portions and load bar hole indentations juxtaposed and extending inward from the shank, and said juxtaposed ridges, valley portions and indented load bar holes and shank portions having the thickness of a standard blade under normal compression.

7. A fold-over electric contact blade adapted to be made from thin stock comprising a first blade section; including a shank; and one end adapted to be attached to an electric wire, a second blade section; including a shank, each said shank having at least one transverse ridge portion across the width of said shank at the cap line of said blade; one longitudinal valley for at least part of its length; said first and second blade sections adapted to be folded with said ridge portion juxtaposed shank extending outward from the shank and said valley portions juxtaposed to limit the thinness of the finished blade.

References Cited by the Examiner

UNITED STATES PATENTS

| | | | |
|---|---|---|---|
| 2,439,767 | 4/1948 | Wermine | 339—63 |
| 2,678,429 | 5/1954 | Abbott | 339—196 X |
| 2,866,172 | 12/1958 | Sapper et al. | 339—62 X |
| 3,134,632 | 5/1964 | Kimball et al. | 229—195 |

EDWARD C. ALLEN, *Primary Examiner.*

W. DONALD MILLER, *Examiner.*